United States Patent
Noh

(10) Patent No.: US 7,649,555 B2
(45) Date of Patent: Jan. 19, 2010

(54) APPARATUS FOR PROCESSING DEAD PIXEL

(75) Inventor: Yo-Hwan Noh, Gyeonggi-do (KR)

(73) Assignee: Mtekvision Co., Ltd., Seoul (KR)

( * ) Notice: Subject to any disclaimer, the term of this patent is extended or adjusted under 35 U.S.C. 154(b) by 423 days.

(21) Appl. No.: 11/537,722

(22) Filed: Oct. 2, 2006

(65) Prior Publication Data

US 2008/0079826 A1    Apr. 3, 2008

(51) Int. Cl.
H04N 9/64    (2006.01)
(52) U.S. Cl. .................................. 348/246
(58) Field of Classification Search .............. 348/246, 348/247, 283, 187, 222.1, 275
See application file for complete search history.

(56) References Cited

U.S. PATENT DOCUMENTS

| | | | | |
|---|---|---|---|---|
| 5,436,659 A | * | 7/1995 | Vincent | 348/246 |
| 5,805,216 A | * | 9/1998 | Tabei et al. | 348/246 |
| 5,995,675 A | * | 11/1999 | Hwang | 382/268 |
| 6,002,433 A | * | 12/1999 | Watanabe et al. | 348/246 |
| 6,563,537 B1 | * | 5/2003 | Kawamura et al. | 348/252 |
| 6,611,288 B1 | * | 8/2003 | Fossum et al. | 348/246 |
| 6,642,960 B1 | * | 11/2003 | Kohashi et al. | 348/246 |
| 6,724,945 B1 | * | 4/2004 | Yen et al. | 382/274 |
| 6,768,512 B1 | | 7/2004 | Hsieh | |
| 7,015,961 B2 | * | 3/2006 | Kakarala | 348/246 |
| 7,283,164 B2 | * | 10/2007 | Kakarala et al. | 348/246 |
| 7,511,748 B2 | * | 3/2009 | Kagle et al. | 348/246 |
| 7,542,082 B2 | * | 6/2009 | Tajima et al. | 348/246 |
| 2001/0052938 A1 | * | 12/2001 | Itoh | 348/246 |
| 2002/0005904 A1 | | 1/2002 | Mendis | |
| 2002/0012476 A1 | | 1/2002 | Dillen et al. | |
| 2002/0196354 A1 | * | 12/2002 | Chang et al. | 348/246 |
| 2003/0001078 A1 | | 1/2003 | Baharav et al. | |
| 2004/0080636 A1 | | 4/2004 | Dong | |
| 2005/0030394 A1 | | 2/2005 | Mendis et al. | |

FOREIGN PATENT DOCUMENTS

| | | |
|---|---|---|
| KR | 2002-0081656 | 10/2002 |
| KR | 10-2005-0057049 | 6/2005 |
| KR | 10-2005-0057049 | 11/2006 |

* cited by examiner

Primary Examiner—Nhan T Tran
Assistant Examiner—Trung Diep
(74) Attorney, Agent, or Firm—Birch, Stewart, Kolasch & Birch, LLP

(57) ABSTRACT

The present invention is related to a method and an apparatus for processing a dead pixel, more specifically to a method and an apparatus thereof for detecting and compensating a dead pixel that can maintain a good image quality by reducing image distortion and deterioration. With the present invention, the distortion of an image, caused by erroneously classifying a normal pixel of an inputted image as a dead pixel, is significantly reduced, thereby improving the quality of a processed image. Moreover, based on the characteristics of the inputted image, the algorithm and accuracy of detecting a dead pixel can be adjusted.

18 Claims, 5 Drawing Sheets

| flag | 9 | 8 | 7 | 6 | 5 | 4 | 3 | 2 | 1 | 0 |

APPARATUS FOR PROCESSING DEAD PIXEL

BACKGROUND OF THE INVENTION

1. Field of the Invention

The present invention is directed to an apparatus for processing a dead pixel, more specifically to an apparatus for detecting and compensating a dead pixel that can maintain excellent image quality by reducing image distortion and image deterioration.

2. Description of the Related Art

An image sensor has a two-dimensional arrangement of pixels, each of which converts light to an electrical signal according to the luminosity. By measuring the electrical signal, the intensity of light entered into each pixel can be inferred, and using this, images made up of pixels can be constructed.

An image sensor comprises pixel arrays, which consists of several hundred thousand to several million pixels, a device to convert analog data sensed from a pixel to digital data, and several hundred to several thousand storage devices. Due to the large number of devices, the image sensor is always exposed to a possibility of making an error in the process, and such an error can cause dead pixels, which become an important factor for determining the level and price of the image sensor. The pixel value resulted from a dead pixel is characterized by being exceedingly larger or smaller than the pixel values of neighboring pixels.

In the conventional method of processing a dead pixel, the data arranged in the horizontal direction are compared to detect and compensate the dead pixel. In reality, however, what is considered to be a dead pixel in the horizontal direction is often not a dead pixel in the vertical direction. For instance, as shown in FIG. 1, a complex image or a macro image may have a minute line in the vertical direction. This kind of minute line is expressed as data having a small number of pixels in the horizontal direction and has a completely different value. Thus, it is highly possible that this minute line is treated as dead pixel data. Therefore, if only the horizontal direction is considered for the compensation of dead pixel data, this kind of minute vertical line will be treated as dead pixels and converted to new values through an appropriate compensation method, thereby resulting in a serious distortion of the actual image.

SUMMARY OF CERTAIN INVENTIVE ASPECTS

In order to solve the above problems, it is an object of the present invention to provide an apparatus for processing a dead pixel that can improve the accuracy of detecting dead pixels. Particularly, by enabling the detection of a dead pixel in the vertical direction, the present invention aims to lower the possibility of treating a minute line of vertical direction as dead pixels.

It is another object of the present invention to provide an apparatus for processing a dead pixel that can selectively apply a variety of dead pixel detection methods in image processing.

It is yet another object of the present invention to provide an apparatus for processing a dead pixel that can adjust the accuracy of detecting a dead pixel.

In order to achieve the above objects, an aspect of the present invention features an apparatus for processing a dead pixel. The apparatus comprises: a horizontal dead pixel detection module, generating corrected pixel data for distinguishing a normal pixel and a dead pixel by testing original pixel data row by row, a pixel flag being coupled to the corrected pixel data; a memory, storing the corrected pixel data; and a vertical dead pixel processing module, comparing with a first threshold a sum of pixel flags belonging to an N×N corrected pixel data block outputted from the memory and replacing with compensated pixel data the original pixel data located in the center of the N×N corrected pixel data block if the sum is smaller than the first threshold. The horizontal dead pixel detection module comprises: a pixel data storage component, storing a series of original pixel data including a base pixel data; a horizontal dead pixel detection component, comparing the base pixel data with neighboring same-kind pixel data and generating a dead pixel detection signal if the base pixel data is determined to be a dead pixel; a frequency detection component, comparing with a second threshold the differences between a plurality of same-kind pixel data and generating a frequency bypass flag if the differences between the same-kind pixel data are smaller than the second threshold; a pattern detection component, comparing with a third threshold the differences between the base pixel data and neighboring pixel data and generating a pattern bypass flag if the differences between the base pixel data and the neighboring pixel data are smaller than the third threshold; and a reference signal generating component, generating the pixel flag corresponding to a combination of the frequency bypass flag and the pattern bypass flag.

The first threshold through the third threshold are adjustable, and the operation of the frequency detection component and the pattern detection component is determined by predetermined operation selection data.

The vertical dead pixel processing module comprises: a vertical dead pixel detection component, calculating a sum of pixel flags of corrected pixel data groups occupied by a line having a different slope among the corrected pixel data belonging to the N×N corrected pixel data block and generating a dead pixel bypass signal in accordance with a comparison result between the sum and the first threshold; a pixel compensation component, generating the compensated pixel data by use of a plurality of same-kind pixel data belonging to the N×N corrected pixel data block; and a multiplexer, selecting and outputting one from a group consisting of the original pixel data and the compensated pixel data in accordance with the dead pixel bypass signal. The sum is calculated by multiplying different weighted values to a plurality of pixel flags.

Another aspect of the present invention features an apparatus for processing a dead pixel. The apparatus comprises: a vertical dead pixel detection component, generating a dead pixel bypass signal in accordance with a comparison result between a sum and a threshold, the sum being calculated by adding pixel flags from each of a plurality of groups, the groups being classified from an N×N block of corrected pixel data coupled to an original pixel data by a pixel flag that can identify a normal pixel and a dead pixel; a pixel compensation component, generating the compensated pixel data by use of a plurality of same-kind pixel data belonging to the N×N corrected pixel data block; and a multiplexer, selecting and outputting one from a group consisting of the original pixel data and the compensated pixel data in accordance with the dead pixel bypass signal. The corrected pixel data group is occupied by a line having a different slope. The sum is calculated by applying a same weighted value to a plurality of pixel flags if the slope is a multiple of 45 degrees. On the other hand, the sum is calculated by applying different weighted values to the plurality of pixel flags if the slope is not a multiple of 45 degrees. The N is an odd number.

BRIEF DESCRIPTION OF THE DRAWINGS

These and other features, aspects, and advantages of the present invention will become better understood with regard to the following description, appended claims, and accompanying drawings where:

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein. Like numbers utilized throughout the various Figures designate like or similar parts or structure.

DETAILED DESCRIPTION OF CERTAIN INVENTIVE EMBODIMENTS

Hereinafter, a preferred embodiment of the present invention will be described with reference to the accompanying drawings. In this description, "vertical" and "vertical direction" do not mean being perpendicular to the horizontal direction, but rather refer to having a slope from the horizontal direction.

As used in this application, the terms "module", "component" and "unit" are intended to refer to, but is not limited to, a software or hardware component, which performs certain tasks. A module or component may advantageously be configured to reside on the addressable storage medium and configured to execute on one or more processors. Thus, a module or component may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Figure 1:
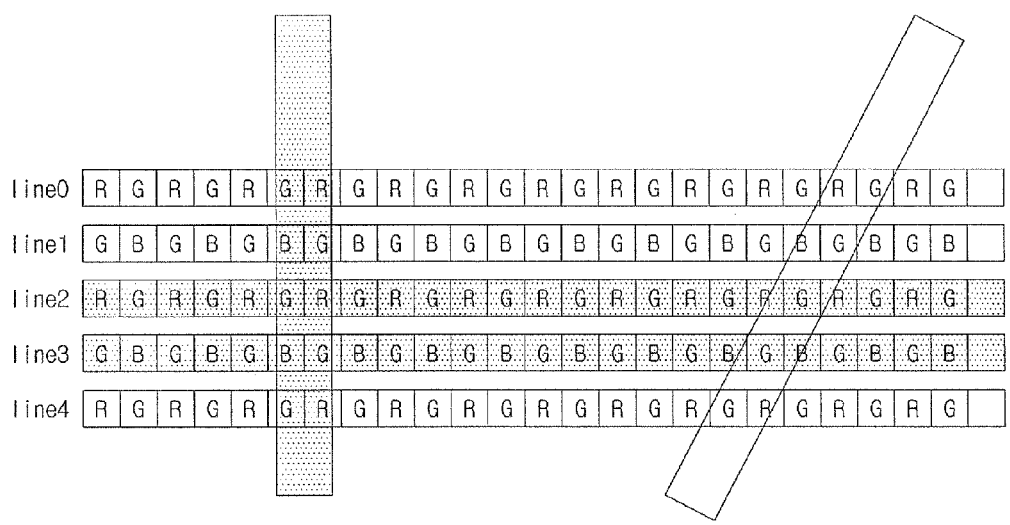
FIG. 1 shows a diagram of a relation between a minute image and pixel data.
Figure 2:
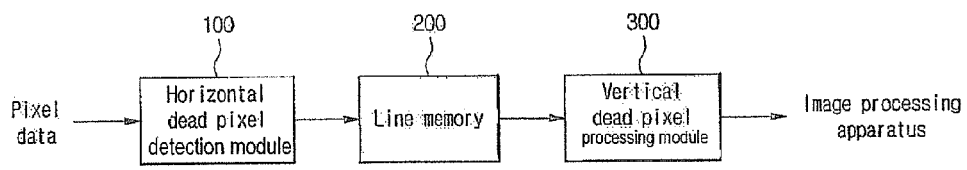
FIG. 2 shows a block diagram of the apparatus for processing a dead pixel in accordance with the present invention.

FIG. 2 is a block diagram showing the apparatus for processing a dead pixel in accordance with the present invention.

A horizontal dead pixel detection module 100 tests a series of original pixel data in the horizontal direction, which is row by row, and inserts a pixel flag, which tells whether the original pixel data is a dead pixel or a normal pixel, into the original pixel data. The inserted pixel flag indicates the possibility of the original pixel data being a dead pixel or a normal pixel, and is used to determine whether the original pixel data will be replaced with compensated pixel data by a vertical dead pixel processing module 300.

A memory 200 stores the original pixel data, in which the pixel flag is inserted, row by row, and can store a plurality of rows of pixel data. The stored pixel data is outputted in the form of an N×N block (N being an odd number). In this description, the case of N being 5 is described.

Once the pixel flag of pixel data ("base pixel data" hereinafter) located in the center of pixel data inputted in the form of an N×N block is set as a dead pixel, the vertical dead pixel processing module 300 adds up pixel flag values of pixel data located in the same block and determines whether the base pixel data is actually a dead pixel. If the base pixel data is determined to be a dead pixel, the vertical dead pixel processing module 300 generates corrected pixel data, using same-kind pixel data located in the same block as the base pixel data. The pixel data located in the same block are divided into a plurality of groups according to a condition, and the added value of the pixel flags per group is compared with a predetermined critical value. Hereinafter, a certain embodiment of the present invention will be described with reference to the accompanying drawings.

Figure 3:
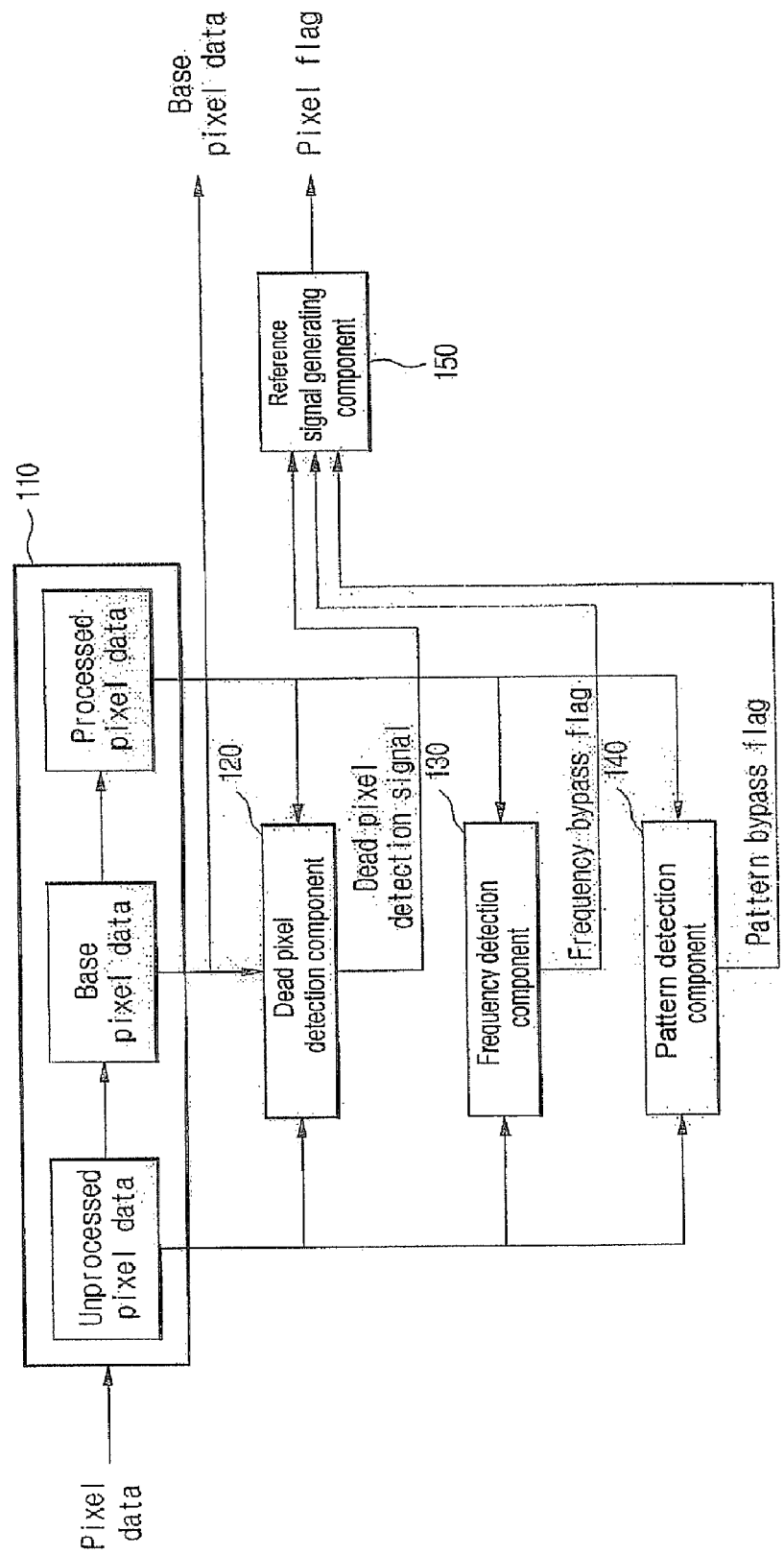
FIG. 3 shows a block diagram of a vertical dead pixel detection module in accordance with a preferred embodiment of the present invention.

FIG. 3 is a block diagram showing the horizontal dead pixel detection module in accordance with a preferred embodiment of the present invention.

A pixel data storage component 110, consisting of a plurality of flipflops, stores a series of sequentially-inputted pixel data, and processes the inputted series of pixel data on a first-come first-served bases. The series of pixel data inputted in the pixel data storage component 110 can be classified as base pixel data, unprocessed pixel data, and processed pixel data, based on the order of input. The unprocessed pixel data and the processed pixel data are used to determine whether the base pixel data is dead pixel data or not. The base pixel data refers to the subject of determining dead pixel data; neighboring pixel data, pixel data located before and after the base pixel data; and neighboring same-kind pixel data, the nearest pixel data to the base pixel data among the same-kind pixel data as the base pixel data.

A horizontal dead pixel detection component 120 compares the base pixel data and the neighboring same-kind pixel data located in the front and back of the base pixel data and determines the possibility of the base pixel data being a dead pixel. If the base pixel data is determined to be dead pixel data, the horizontal dead pixel detection component 120 outputs a dead pixel detection signal. To determine a dead pixel, various methods, including the threshold method, the weighted method, and the threshold count method, are used. The threshold method determines the presence of a dead pixel by determining if the difference between the base pixel data and the neighboring same-kind pixel data exceeds a predetermined threshold. The weighted method determines the presence of a dead pixel by comparing the multiplication of the neighboring same-kind pixel data and the weighted value with the base pixel data. In the threshold count method, the difference between the same kind pixels that exceeds a predetermined threshold is counted, and the pixel whose difference exceeds a predetermined number is considered a dead pixel. There can be many other methods, and the combinations thereof, for determining a dead pixel, but the weighted method will be described hereinafter.

Base pixel data=$G_1$

Neighboring same-kind pixel data=$G_0$ and $G_2$

Weighted value=$a_1$  EQ. 1

Condition for determining a dead pixel: $G_1 > a_1 G_0$ AND $G_1 > a_1 G_2$

If G1 satisfies EQ. 1, the above base pixel data is determined to be a dead pixel. Here, other methods for determining a dead pixel can be added in order to further determine if the base pixel data satisfying the above EQ. 1 is a dead pixel. The base pixel data satisfying the above EQ. 1 can be determined whether it is a dead pixel by determining whether the base pixel data is smaller than the upper threshold, larger than the lower threshold, or between the upper threshold and the lower threshold. The weighted value, the upper threshold and/or the lower threshold is stored in a register (not shown) located inside the horizontal dead pixel detection module 100, and can be substituted by a register value inputted from outside.

A frequency detection component 130 determines if the differences between the same-kind pixel data are smaller than a predetermined threshold, and, if smaller, outputs a frequency bypass flag. Here, different values for the threshold can be used depending on the frequency of the image. An image with a low frequency has little change of difference in values between the same-kind pixels, and an image with a high frequency has a bigger change of difference in values between the same kind pixels. The frequency detection component 130 calculates the relative differences between a plurality of same-kind pixel data having the same elements among a plurality of pixel data located in the pixel data storage component 110, and determines if the calculated differences are smaller than the upper threshold, bigger than the lower threshold, or between the upper threshold and the lower threshold. Hereinafter, the area that is smaller than the upper threshold, bigger than the lower threshold or between the upper threshold and the lower threshold is referred to as a window. The upper threshold and/or the lower threshold is stored in a register of the frequency detection component 130, and can be substituted by a register valued inputted from outside. Moreover, the register can further comprise data that selects the operation of the frequency detection component 130. Therefore, the frequency detection component 130 may not operate in accordance with the register value.

The detailed operation of the frequency detection component 130 is as follows: A low frequency window is applied to an image with little change, and if all of the differences in absolute values between the base pixel data and the same-kind pixel data are located in the low frequency window, it is determined that the frequency bypass condition is satisfied. A high frequency window is applied to an image with large change, and if all of the differences in absolute values between the base pixel data and the same-kind pixel data are located in the high frequency window, it is determined that the frequency bypass condition is satisfied. If there is a value that exceeds the window, no frequency bypass flag is outputted.

A pattern detection component 140 determines if the difference between the base pixel data and the neighboring pixel data is smaller than a predetermined threshold and, if smaller, outputs a pattern bypass flag. Although a series of pixel values are actually inputted in the form of a Bayer pattern (GRGB . . . ), since conventional algorithms handle the same elements only, a high frequency element tends to be replaced by a low frequency element, or vice versa, thereby resulting in the distortion of color, when the resolution chart is photographed in black and white. Thus, this problem can be solved by determining whether the base pixel data is to be bypassed, through a relative comparison of the G-R elements or G-B elements. The threshold needed for the comparison is stored in a register of the pattern detection component 140 and can be substituted by a register value inputted from outside. Moreover, the register can further comprise data that selects the operation of the pattern detection component 140. Therefore, the pattern detection component 140 may not operate in accordance with the register value.

The frequency bypass flag and the pattern bypass flag are used as the condition to determine whether to generate the pixel flag, in case the base pixel data is determined to be a dead pixel by the horizontal dead pixel detection component 120. Thus, the horizontal dead pixel detection module 100 may comprise only one of the frequency detection component 130 and the pattern detection component 140. Moreover, since the operation of the frequency detection component 130 and the pattern detection component 140 can be determined by a predetermined register value, the user can choose either one or both of the frequency detection component 130 and the pattern detection component 140 for processing the dead pixel.

A reference signal generating component 150 sets a pixel flag according to the combination of the dead pixel detection signal, the frequency bypass flag and/or the pattern bypass flag. When setting the pixel flag, the activation status of each detector is considered. That is, the frequency detection component 130 and pattern detection component 140 may be activated or deactivated by the user setting, and the bypass flag will become different accordingly. In case the frequency detection component 130 and pattern detection component 140 are both activated, the pixel flag value is set as a normal pixel, regardless of the dead pixel detection signal, because the condition for bypass is considered to be satisfied only if the flag is inputted from both detectors. If the bypass flag is not inputted from any one of the detectors, the pixel flag value is set as a normal pixel or a dead pixel, according to the presence of the dead pixel detection signal. In case only one of the frequency detection component 130 and pattern detection component 140 is activated, the pixel flag value is set as a normal pixel, regardless of the dead pixel detection signal, because the condition for bypass is satisfied even if one bypass flag is inputted. If the bypass flag is not inputted from the activated detector, the pixel flag value is set as a normal pixel or a dead pixel, according to the presence of the dead pixel detection signal. In case the frequency detection component 130 and pattern detection component 140 are both deactivated, the condition for bypass is not applicable, and therefore the pixel flag value is set as a normal pixel or a dead pixel, according to the presence of the dead pixel detection signal. If the dead pixel detection signal is not inputted, the pixel flag value is always set as a normal pixel. The above description is summarized in the table below:

TABLE 1

| Activation status | Presence of flag | Pixel flag |
|---|---|---|
| Both frequency detection component and pattern detection component activated | Frequency flag and pattern flag | 0 |
| Both frequency detection component and pattern detection component activated | Frequency flag or pattern flag | Output by dead pixel processing module (1 or 0) |

TABLE 1-continued

| Activation status | Presence of flag | Pixel flag |
|---|---|---|
| Both frequency detection component and pattern detection component activated | None | Output by dead pixel processing module (1 or 0) |
| Only one detector activated | Frequency flag or pattern flag | 0 |
| Only one detector activated | None | Output by dead pixel processing module |
| Both detectors deactivated | None | Output by dead pixel processing module |

Figures 4, 5:
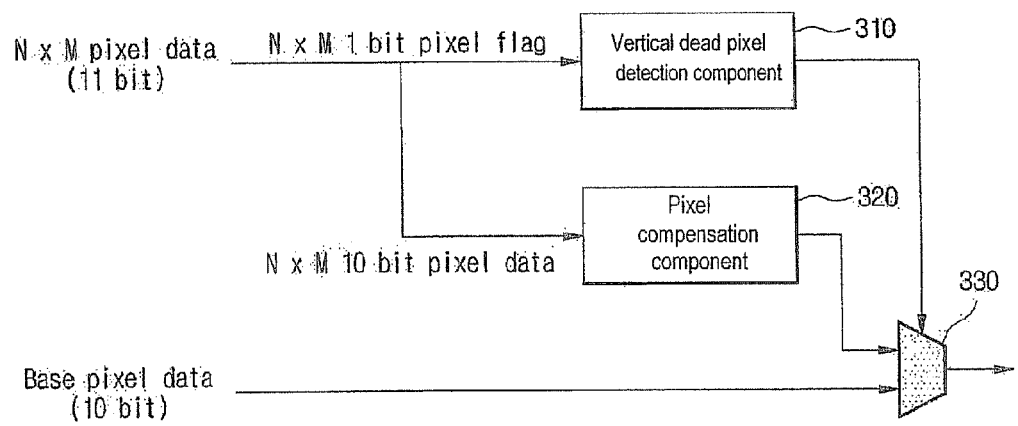
FIG. 4 shows a structure of corrected pixel data.
FIG. 5 shows a block diagram of a horizontal dead pixel processing module in accordance with a preferred embodiment of the present invention.

The reference signal generating component 150 can assign a new bit to the pixel data to include the pixel flag. By synchronizing the pixel flag to the output of the base pixel data and outputting the pixel flag, the reference signal generating component 150 allows the memory 200 to treat and store the pixel data and pixel flag as a single piece of data. The pixel data, to which the pixel flag is coupled, as shown in FIG. 4, is called "corrected pixel data." The corrected pixel data shown in FIG. 4 consists of 10 bits of pixel data and 1 bit of pixel flag. The pixel flag, which indicates the possibility of the corresponding pixel data being a dead pixel, uses the frequency bypass flag and pattern bypass flag to express the determined result as 1 bit, in case the reference signal generating component 150 generates a dead pixel detection signal. However, the pixel flag does not necessarily have to be expressed in 1 bit, and it should be evident that the pixel flag can comprise all information, including the activation status of the detector, the condition for detection (threshold), and the bypass flag, needed for determining the corresponding pixel data. The reference signal generating component 150 may assign a new bit for the pixel flag as the upper-most bit or the lower-most bit of the corrected pixel data. In another embodiment, the memory 200 may separate and store the pixel data and pixel flag, or combine the pixel data and pixel flag, which are separately inputted, and store in a form of corrected pixel data.

Figure 6:
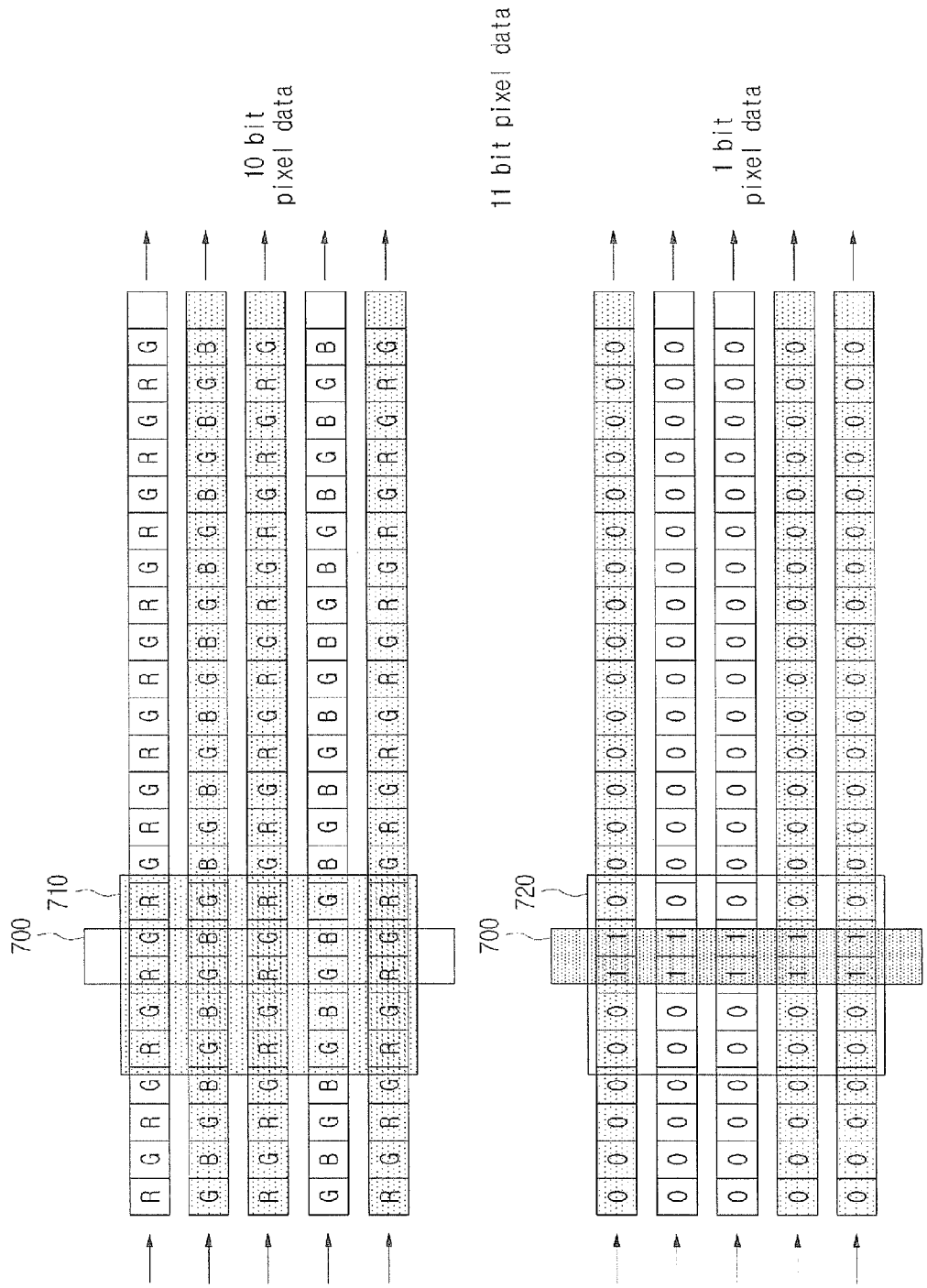
FIG. 6 shows corrected pixel data, each of which is expressed as a 5×5 pixel data block and a 5×5 pixel flag block, respectively.
Figure 7:
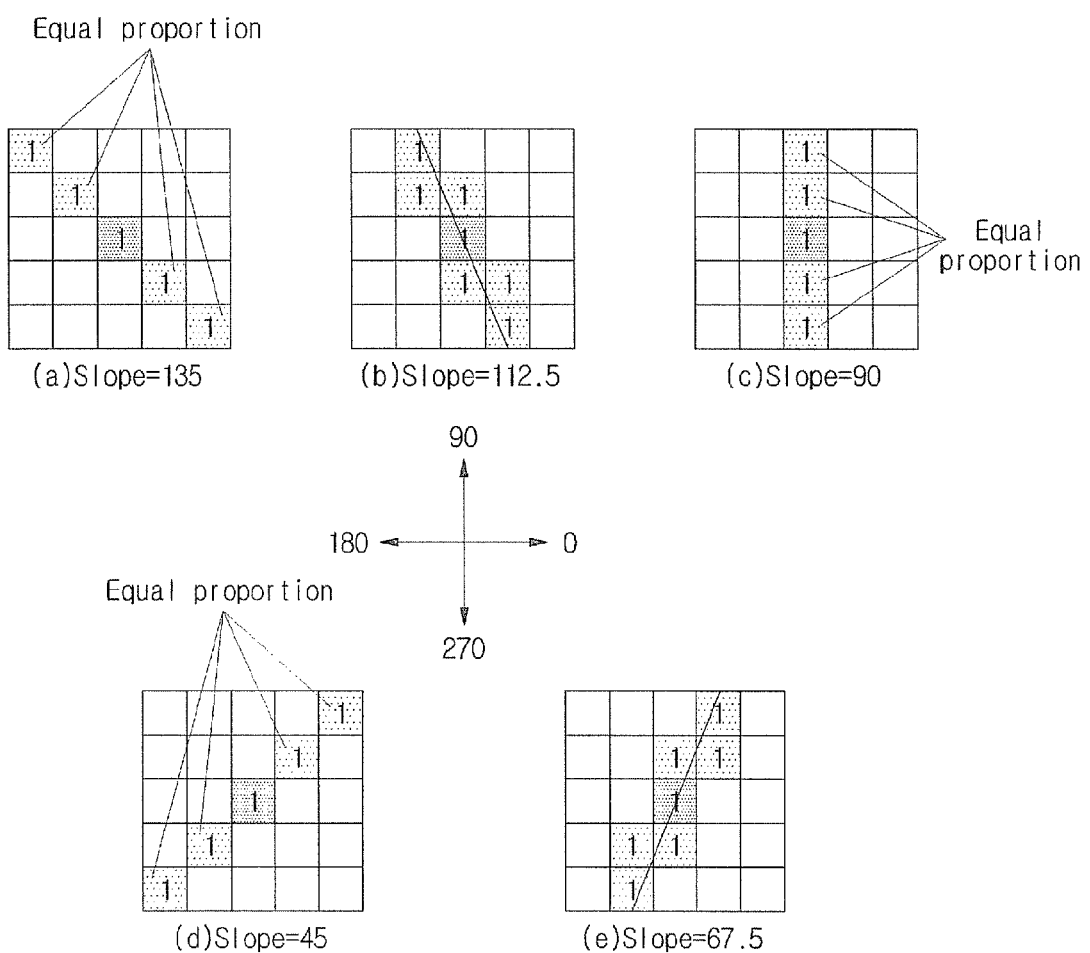
FIG. 7 illustrates a method for detecting a vertical dead pixel.

FIG. 5 is a block diagram showing a vertical dead pixel processing module in accordance with a preferred embodiment of the present invention; FIG. 6 shows corrected pixel data, each of which is expressed as a 5×5 pixel data block and a 5×5 pixel flag block, respectively; and FIG. 7 illustrates a method for detecting a vertical dead pixel.

The corrected pixel data stored in the memory 200 is inputted to the vertical dead pixel processing module 300 in units of 5×5 blocks. The base pixel data is located in the center of the block. In FIG. 6, the corrected pixel data block is separated to a 5×5 pixel data block 710 and a 5×5 pixel flag block 720. Here, a minute vertical line 700 occupies a part of the pixel data inside the 5×5 pixel data block 710, and the pixel flags of the pixel data occupied by the vertical line 700 are set as dead pixels by the horizontal dead pixel detection module 100. In case the pixel flags of the base pixel data are set as dead pixels, the 5×5 pixel flag block 720 is used to determine whether the base pixel data is actually a dead pixel even if the vertical direction is considered, and a part of the 5×5 pixel data block 710 is used to generate compensated pixel data. The size of the block is not restricted to 5×5, and may be increased to improve the accuracy of dead pixel detection.

The corrected pixel data, inputted in units of blocks, is separated once again to pixel data and pixel flags, and is applied to a vertical dead pixel detection component 310 and a pixel compensation component 320. In another embodiment, the vertical dead pixel detection component 310 and pixel compensation component 320 can receive the corrected pixel data itself and ignore the unnecessary part (e.g. the pixel data in the case of the vertical dead pixel detection component) and use the necessary part (e.g. the pixel flag in the case of the vertical dead pixel detection component) to detect a dead pixel and generate a compensated pixel.

In case the pixel flag corresponding to the base pixel data is set as a dead pixel, the vertical dead pixel detection component 310 determines whether the base pixel data is actually a dead pixel by summing up a plurality of predetermined flag values according to the slope of the vertical direction line and comparing the values with the threshold. If the pixel flag is determined to be not a dead pixel, a dead pixel bypass signal is outputted. The method for detecting a vertical direction dead pixel by the vertical dead pixel detection component 310 will be described with reference to FIG. 7.

As shown in FIG. 7, the vertical direction line can have a variety of slopes, by which the occupied pixel data differs. The set of occupied pixel data per the slope of the line may be predetermined. In the case of a 5×5 block, as in FIG. 7, the vertical direction line can have slopes of 45 degrees, 67.5 degrees, 90 degrees, 112.5 degrees, and 135 degrees. Of course in a bigger block size, there can be more varieties of slopes. When the slope is 45 degrees, 90 degrees, or 135 degrees, the pixel data occupied by the line express the line with an equal proportion, but when the slope is 67.5 degrees or 112.5 degrees, the pixel data occupied by the line express the line with different proportions, and some pixel data are included in a line having a different slope. Therefore, when summing up pixel flag values of the pixel data occupied by the lines having different slopes, as shown in FIG. 7, the vertical dead pixel detection component 310 simply adds up the pixel flag values if the proportion is equal but multiplies a different weighted value to each pixel flag if the proportion is different. The weighted value can be a percentage of the length the pertinent pixel data occupies in the line. Of course, the weighted value can be determined by various bases.

If the sum of each group calculated through the above method is smaller than a predetermined threshold, the base pixel data is determined as dead pixel data. The threshold can be set differently per each group, and can be reset. If the sum of any group is bigger than the threshold, the vertical dead pixel detection component 310 outputs a dead pixel bypass signal and allows the base pixel data to be outputted as is.

The pixel compensation component 320 generates compensated pixel data for compensating the base pixel data. In the case of green pixel data, the center pixel data of a red area, which is determined to be dead pixels, becomes replaced by a new value by referencing neighboring same-kind pixel data. The new value can be obtained by averaging the values of 12 neighboring same-kind pixels, 4 of which are immediately neighboring the base pixel data in the center and weighted more, and 8 of which are located outside the 4 pixels and are weighted relatively lighter. Other methods, including obtaining the average of 2 neighboring same-kind pixel data located on the same line and obtaining the average of 4 neighboring same-kind pixel data, are also applicable. This way, the image components of the vertical direction as well as the horizontal direction are taken into consideration, minimizing any algorithmic error on the edge of an image or the minute line. In the case of red and blue colors, the method of applying the average of 8 same-kind pixels located outside and the method of applying the average of 2 neighboring same-kind pixels on the same line can be used.

A multiplexer 330 receives the base pixel data and the compensated pixel data, and outputs one of these data in accordance with the dead pixel bypass signal. Once the dead pixel bypass signal is inputted, the base pixel data is outputted, and if no dead pixel bypass signal is inputted, the compensated pixel data is outputted.

So far, an embodiment applied to the compensation of the dead pixel data, occurred by a dead pixel of an image sensor has been described, but the inputted image does not necessarily have to be generated by an image sensor. In other words, the apparatus for processing a dead pixel in accordance with the present invention can also be used in a noise filter for removing random noise, salt noise, and pepper noise, occurred in a normal image.

As described above, with the present invention, the accuracy of detecting dead pixels becomes greatly improved by enabling the detection of a dead pixel in the vertical direction as well as in the horizontal direction. Therefore, the possibility of treating a minute line of vertical direction as dead pixels is greatly lowered, and improvement of image quality in the edge areas can be expected.

Although a preferred embodiment of the present invention has been described, anyone of ordinary skill in the art to which the invention pertains should be able to understand that a very large number of permutations are possible without departing the spirit and scope of the present invention, which shall only be defined by the claims appended below.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for processing a dead pixel, comprising:
a horizontal dead pixel detection module, the horizontal dead pixel detection module determining whether a base pixel is a dead pixel by comparing the base pixel with at least one pixel adjacent to the base pixel in a same row, the horizontal pixel detection module referencing the dead pixel by a pixel flag to generate a corrected pixel data, the corrected pixel data including the pixel flag;
a memory, the memory storing the corrected pixel data; and
a vertical dead pixel processing module, the vertical dead pixel processing module comparing a sum of a plurality of pixel flags included in a predetermined sized corrected pixel data block of the corrected pixel data outputted from the memory and a first threshold value, the vertical dead pixel processing module replacing original pixel data located in the predetermined sized corrected pixel data block with compensated pixel data in accordance to a result from the comparing of the sum of the plurality of pixel flags and the first threshold value.

2. The apparatus of claim 1, wherein the horizontal dead pixel detection module comprises:
a pixel data storage component, the pixel data storage component storing a series of the original pixel data including a base pixel data;
a horizontal dead pixel detection component, the horizontal dead pixel detection component comparing the base pixel data and neighboring same-kind pixel data, the horizontal dead pixel detection component generating a dead pixel detection signal if the base pixel data is determined to be a dead pixel;
a frequency detection component, the frequency detection component comparing differences between a plurality of same-kind pixel data and a second threshold value, the frequency detection component generating a frequency bypass flag in accordance to the comparing of the differences between the plurality of the same-kind pixel data and the second threshold value;
a pattern detection component, the pattern detection component comparing differences between the base pixel data and the neighboring pixel data, and a third threshold value, the pattern detection component generating a pattern bypass flag in accordance to the comparing of the differences between the base pixel data and the neighboring pixel data, and the third threshold value; and
a reference signal generating component, the reference signal generating component generating the pixel flag corresponding to a predetermined instruction based upon conditions of a combination of the frequency bypass flag and the pattern bypass flag.

3. The apparatus of claim 2, wherein the first threshold value through the third threshold value are adjustable.

4. The apparatus of claim 2, wherein an operation of the frequency detection component and the pattern detection component is determined by predetermined operation selection data.

5. The apparatus of claim 1, wherein the vertical dead pixel processing module comprises:
a vertical dead pixel detection component, the vertical dead pixel detection component calculating a sum of a plurality of pixel flags of the corrected pixel data in the predetermined sized corrected pixel data block of corrected pixel data groups located in at least one line having an angular relationship with a horizontal line, and the vertical dead pixel detection component generating a dead pixel bypass signal by comparing the sum of said the plurality of pixel flags and the first threshold value;
a pixel compensation component, the pixel compensation component generating the compensated pixel data; and
a multiplexer, the multiplexer selecting and outputting one of the original pixel data and the compensated pixel data in accordance with the dead pixel bypass signal.

6. The apparatus of claim 5, wherein the sum of the plurality of the pixel flags is calculated by multiplying different weighted values to the plurality of pixel flags.

7. The apparatus of claim 1, wherein the horizontal dead pixel detection module provisionally indicates that the base pixel is a dead pixel via the pixel flag, and the vertical dead pixel processing module confirms that the base pixel is a dead pixel via the result from the comparing of the sum of the plurality of pixel flags and the first threshold value.

8. An apparatus for processing a dead pixel, comprising:
a vertical dead pixel detection component, the vertical dead pixel detection component generating a dead pixel bypass signal in accordance with a comparison result between a sum and a threshold, the sum being calculated by adding pixel flags from each of a plurality of lines having an angular relationship with a horizontal line of a predetermined sized block of corrected pixel data, the corrected pixel data being an original pixel data coupled to the each pixel flag that can identify a normal pixel and a dead pixel;
a pixel compensation component, the pixel compensation component generating compensated pixel data by use of a plurality of same-kind pixel data belonging to the predetermined sized block of the corrected pixel data; and
a multiplexer, the multiplexer selecting and outputting one from a group consisting of original pixel data and the compensated pixel data in accordance with the dead pixel bypass signal.

9. The apparatus of claim 8, wherein the each of the plurality of the lines has a different angular relationship with the horizontal line.

10. The apparatus of claim 9, wherein the sum is calculated by applying a same weighted value to a plurality of pixel flags if the angular relationship is a multiple of 45 degrees.

11. The apparatus of claim 9, wherein the sum is calculated by applying different weighted values to a plurality of pixel flags if the angular relationship is not a multiple of 45 degrees.

12. The apparatus of claim 8, wherein the predetermined sized block of the corrected pixel data is N×N and N is an odd number.

13. An apparatus for processing a dead pixel, comprising:
means for determining whether a base pixel is a dead pixel by comparing the base pixel with at least one pixel adjacent to the base pixel in a same row, the means for determining whether a base pixel is a dead pixel referencing the dead pixel by a pixel flag to generate a corrected pixel data, the corrected pixel data including the pixel flag;
a memory, the memory storing the corrected pixel data; and
means for comparing a sum of a plurality of pixel flags included in a predetermined sized corrected pixel data block of the corrected pixel data outputted from the memory and a first threshold value, the means for comparing the sum of the plurality of pixel flags and the first threshold replacing original pixel data located in the predetermined sized corrected pixel data block with compensated pixel data in accordance to a result from the comparing of the sum of the plurality of the pixel flags and the first threshold value.

14. The apparatus of claim 13, wherein the means for determining whether a base pixel is a dead pixel provisionally indicates that the base pixel is a dead pixel via the pixel flag, and the means for comparing a sum of the plurality of pixel flags and the first threshold confirms that the base pixel is a dead pixel via the result from the comparing of the sum of the plurality of pixel flags and the first threshold value.

15. An apparatus for processing a dead pixel, comprising:
means for generating a dead pixel bypass signal in accordance to result from a comparison of a sum and a threshold value, the sum being calculated by adding pixel flags from each of a plurality of lines having an angular relationship with a horizontal line of a predetermined sized block of corrected pixel data, the corrected pixel data including the pixel flag that is indicative of a dead pixel;
means for generating compensated pixel data by use of a plurality of same-kind pixel data belonging to the predetermined sized block of the corrected pixel data; and
a multiplexer, the multiplexer selecting and outputting one of original pixel data and the compensated pixel data in accordance with the dead pixel bypass signal.

16. An apparatus for processing a dead pixel, comprising:
a horizontal dead pixel detection module, the horizontal dead pixel detection module identifying dead pixels of original pixel data row by row, the horizontal dead pixel detection module generating corrected pixel data by referencing the dead pixels with a pixel flag, the pixel flag being coupled to the original pixel data as corrected pixel data;
a line memory, the line memory storing the corrected pixel data; and
a vertical dead pixel processing module, the vertical dead pixel processing module comparing a sum of pixel flags belonging to an N×N corrected pixel data block of the corrected pixel data outputted from the line memory and a first threshold value, the vertical dead pixel processing module replacing the original pixel data located in a center of the N×N corrected pixel data block with compensated pixel data in accordance to a result from the comparing of the sum of the pixel flags and the first threshold value.

17. The apparatus of claim 16, wherein the horizontal dead pixel detection module provisionally indicates a dead pixel via the pixel flag, and the vertical dead pixel processing module confirms that the base pixel is a dead pixel via the result from the comparing of the sum of the pixel flags and the first threshold value.

18. The apparatus of claim 16, wherein the vertical dead pixel processing module comprises:
a vertical dead pixel detection component, the vertical dead pixel detection component calculating the sum of the pixel flags of corrected pixel data groups occupied by a line having a different slope among the corrected pixel data belonging to the N×N corrected pixel data block, the vertical dead pixel detection component generating a dead pixel bypass signal in accordance with a comparison result between the sum of the pixel flags and the first threshold value;
a pixel compensation component, the pixel compensation component generating the compensated pixel data by use of a plurality of same-kind pixel data belonging to the N×N corrected pixel data block; and
a multiplexer, the multiplexer selecting and outputting one from a group consisting of the original pixel data and the compensated pixel data in accordance with the dead pixel bypass signal.

* * * * *